(12) United States Patent
Ligtenberg et al.

(10) Patent No.: US 7,486,165 B2
(45) Date of Patent: Feb. 3, 2009

(54) MAGNETIC LATCH MECHANISM

(75) Inventors: Chris A. Ligtenberg, San Carlos, CA (US); Brett William Degner, Menlo Park, CA (US); Joshua Banko, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 11/582,212

(22) Filed: Oct. 16, 2006

(65) Prior Publication Data
US 2008/0186683 A1 Aug. 7, 2008

(51) Int. Cl.
H01H 9/00 (2006.01)
G06F 1/16 (2006.01)
H05K 5/00 (2006.01)

(52) U.S. Cl. .................. 335/205; 361/681; 361/683
(58) Field of Classification Search .......... 16/319, 16/320; 24/303; 292/251.5; 335/212, 237, 335/273, 298, 205, 206, 207; 361/681, 683
See application file for complete search history.

(56) References Cited

U.S. PATENT DOCUMENTS

| | | | | |
|---|---|---|---|---|
| 5,631,618 A * | 5/1997 | Trumper et al. | ............. | 335/299 |
| 6,129,395 A * | 10/2000 | Schlesener et al. | .......... | 292/128 |
| 6,151,486 A * | 11/2000 | Holshouser et al. | ...... | 455/575.3 |
| 6,324,052 B1 * | 11/2001 | Azima et al. | ................ | 361/683 |
| 6,370,376 B1 * | 4/2002 | Sheath | ..................... | 455/556.1 |
| 6,542,372 B1 * | 4/2003 | Paquin et al. | ................ | 361/758 |
| 6,653,919 B2 | 11/2003 | Shih-Chung et al. | | |
| 6,929,291 B2 * | 8/2005 | Chen | ........................ | 292/251.5 |
| 7,042,713 B2 * | 5/2006 | Nicolosi | ..................... | 361/681 |
| 7,082,035 B2 | 7/2006 | Kim | | |
| 7,259,970 B2 * | 8/2007 | Nakayabu | .................... | 361/810 |
| 7,286,369 B2 * | 10/2007 | Yaor | .......................... | 361/801 |
| 2002/0043608 A1 * | 4/2002 | Nakata et al. | ............... | 248/560 |
| 2004/0174670 A1 * | 9/2004 | Huang et al. | ................. | 361/683 |
| 2004/0197713 A1 * | 10/2004 | Ohfuji et al. | ................ | 430/322 |
| 2005/0000327 A1 * | 1/2005 | Monroig et al. | ............ | 81/121.1 |
| 2005/0142936 A1 * | 6/2005 | Sung et al. | ................... | 439/564 |
| 2005/0167992 A1 * | 8/2005 | Lo et al. | .................. | 292/251.5 |
| 2005/0236848 A1 * | 10/2005 | Kim | ........................ | 292/251.5 |
| 2006/0006674 A1 * | 1/2006 | Kang et al. | ............... | 292/251.5 |
| 2006/0023408 A1 * | 2/2006 | Schlesener et al. | .......... | 361/683 |
| 2007/0133156 A1 * | 6/2007 | Ligtenberg et al. | .......... | 361/681 |

* cited by examiner

*Primary Examiner*—Elvin G Enad
*Assistant Examiner*—Alexander Talpalatskiy
(74) *Attorney, Agent, or Firm*—IP Strategy Group, P.C.

(57) ABSTRACT

A magnetic latch mechanism for latching a first electronic assembly to a second electronic assembly. The magnetic latch mechanism includes a Halbach array captured by the first electronic assembly. The Halbach array is configured to provide a first magnetic flux in a first direction. The magnetic latch mechanism further includes an attraction plate captured by the second electronic assembly. The attraction plate is configured to be coupled with the first magnetic flux when the first electronic assembly is in a closed position with respect to the second electronic assembly such that there is mutual attraction between the attraction plate and the Halbach array in the closed position.

21 Claims, 8 Drawing Sheets

MAGNETIC LATCH MECHANISM

BACKGROUND OF THE INVENTION

An electronic device that includes a display such as a notebook computer, media player, game device, or navigation device may include a display assembly and a base assembly. Typically, an edge of the display assembly is connected with the base assembly by one or more hinges or clutches so that the display assembly can be pivoted open to reveal the display screen of the display assembly to the user or closed to protect the display screen. To ensure that the electronic device stays closed, the electronic device may further include a latch mechanism for securing the display assembly in the closed position.

Conventionally, the latch mechanism may include a latch and a catch for securing the display assembly in the closed position. However, the latch and catch components may be vulnerable to impact damage and may pose significant reliability issues. To better withstand impact and wear, the latch and catch and other related moving components may be manufactured with high performance materials. However, the additional cost of the high performance material disadvantageously increases the overall cost of the electronic device. Further, such a latch mechanism occupies some amount of space and may need to be housed in gaps, voids, or recesses in the display assembly and/or the base assembly. These gaps, voids, or recesses may significantly compromise the structure and/or aesthetics of the electronic device and possibly allow debris and/or moisture to cause damage to the electronic device.

Alternatively, in some conventional configurations, a "pop-down" cam mechanism may be provided at the clutch to provide some force for resisting the unintentional opening of the display assembly. In other conventional configurations, a complex over-center mechanism may be provided to snap shut the display assembly and to keep the display assembly snap shut. Both of these alternative mechanisms typically require a large form factor to implement and therefore may be undesirable to users from an aesthetic point of view.

In some other conventional configurations, one or more magnets may be installed in the display assembly, the base assembly, or both to provide an attraction force for latching the assemblies. However, many other components of the electronic device may be sensitive to magnetic effects. As such, the use of magnets may complicate the design and arrangement of components inside the electronic device, which may require for example magnetic shielding to protect these sensitive components. Installation of magnetic shields may incur increased manufacturing cost as well as consume some of the internal space of the electronic device, resulting in an undesirably bulky final product.

SUMMARY

The invention relates, in an embodiment, to a magnetic latch mechanism for latching a first electronic assembly to a second electronic assembly. The magnetic latch mechanism includes a Halbach array captured by the first electronic assembly. The Halbach array is configured to provide a first magnetic flux in a first direction. The magnetic latch mechanism further includes an attraction plate captured by the second electronic assembly. The attraction plate is configured to be coupled with the first magnetic flux when the first electronic assembly is in a closed position with respect to the second electronic assembly such that there is mutual attraction between the attraction plate and the Halbach array in the closed position.

In one or more embodiments, the invention relates to an electronic device having a magnetic latch mechanism. The electronic device includes a first electronic assembly and a second electronic assembly pivotally connected with the first electronic assembly. The electronic device also includes magnetic means for providing an uneven magnetic flux with respect to at least two sides of the magnetic means. A first side of the magnetic means has a first magnetic flux that is higher in intensity relative to a second magnetic flux associated with a second side of the magnetic means. The magnetic means is captured by the first electronic assembly. The electronic device further includes attraction means for magnetically attracting the magnetic means. The attraction means is captured by the second electronic assembly. The attraction means is configured to be coupled with the first magnetic flux when the first electronic assembly is in a closed position with respect to the second electronic assembly such that there is mutual attraction between the attraction plate and the Halbach array in the closed position.

In one or more embodiments, the invention relates to an electronic device having a magnetic latch mechanism. The electronic device includes a first electronic assembly and a second electronic assembly pivotally connected with the first electronic assembly. The electronic device also includes a magnetic unit captured by the first electronic assembly. The magnetic unit is configured to provide a first magnetic flux in a first direction. The electronic device further includes an attraction plate captured by the second electronic assembly. The attraction plate is configured to be coupled with the first magnetic flux when the first electronic assembly is in a closed position with respect to the second electronic assembly such that there is mutual attraction between the attraction plate and the Halbach array in the closed position.

These and other features of the present invention will be described in more detail below in the detailed description of the invention and in conjunction with the following figures

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
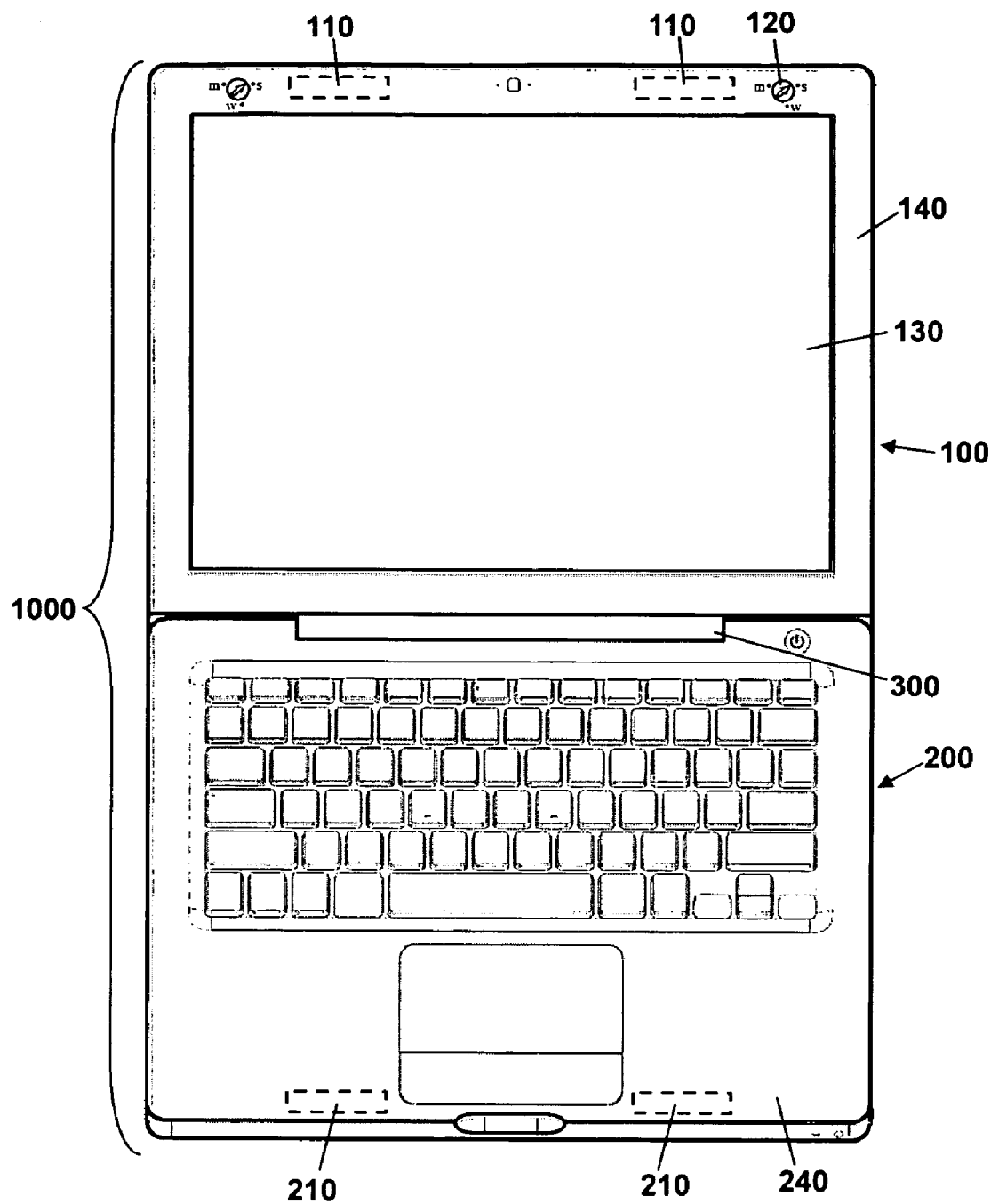
FIG. 1 shows an illustrative representation of an electronic device and a magnetic latch mechanism in accordance with one or more embodiments of the present invention.

FIG. 1 shows an illustrative representation of an electronic device 1000 and a magnetic latch mechanism in accordance with one or more embodiments of the present invention. In accordance with one or more embodiments of the present invention, as illustrated in FIG. 1, electronic device 1000 is a portable computing device. However, electronic device 1000 may represent any electronic device (such as a portable video player, a portable music player, a communication device, etc.) that has two or more assemblies pivotally connected together.

As shown in FIG. 1, electronic device 1000 includes a display assembly 100, a base assembly 200, and a magnetic latch mechanism that includes at least one tuning bumper 120, at least one attraction plate 210, and at least one Halbach array 110. Display assembly 100 further includes an electronic display 130 and a display bezel 140. Halbach array 110 is captured (i.e., encapsulated or held fixed) by display bezel 140 and/or additional parts of display assembly 100 and is configured to provide a magnetic flux. Halbach array 110 will be discussed further with reference to FIG. 3 below.

Base assembly 200 includes a top case 240. Further, base assembly 200 includes at least one attraction plate 210, captured by top case 240. Attraction plate 210 is configured to be coupled with the magnetic field provided by Halbach array 110 when display assembly 100 is near or in a closed position with respect to base assembly 200 such that there is a mutual attraction force between attraction plate 210 and Halbach array 110, causing display assembly 100 to be biased to a closed position relative to base assembly 200. As shown in FIG. 1, Halbach array 110 is disposed opposite attraction plate 210 when the electronic device is in a closed position. In one or more embodiments of the present invention, attraction plate 210 is formed of a material that includes a ferrous or magnetic material.

Electronic device 1000 further includes at least one connecting element 300. Connecting element 300 is typically disposed away from Halbach array 110 and is configured to pivotally connect an edge of display assembly 100 and base assembly 200. In accordance with one or more embodiments of the present invention, connecting element 300 may include hinges, hooks, pins, snaps, detents or other suitable pivotal connecting structures. In accordance with one or more embodiments of the present invention, connecting element 300 is considered a component of the magnetic latch mechanism.

Figure 2A:
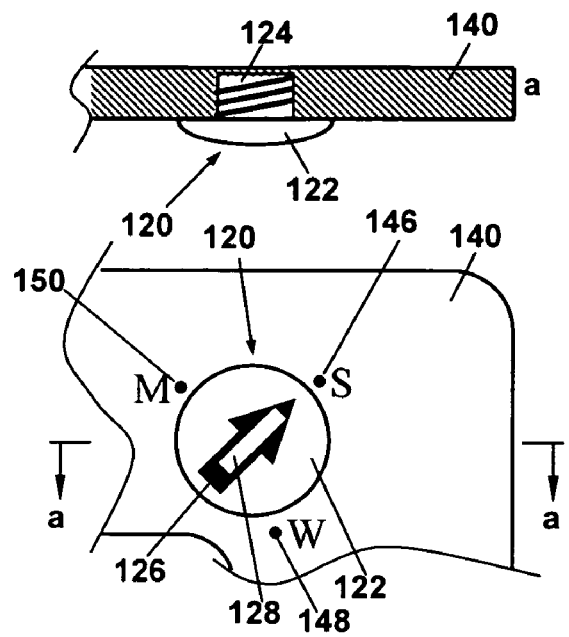
FIGS. 2A-D show an illustrative representation of a tuning bumper in accordance with one or more embodiments of the present invention and uses thereof.
Figure 2B:
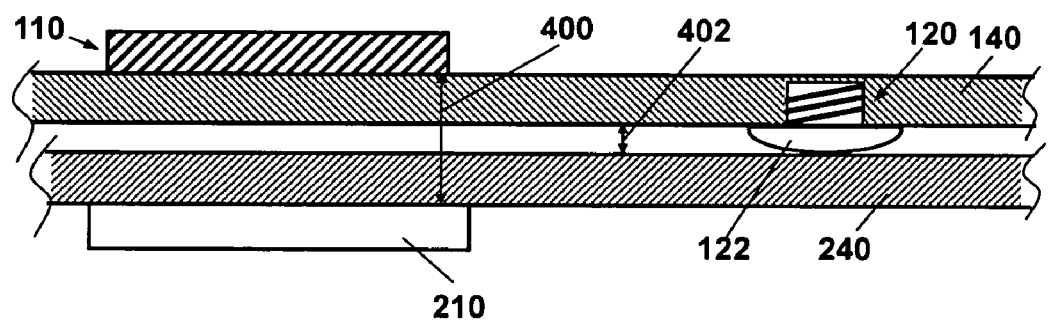
Figure 2C:
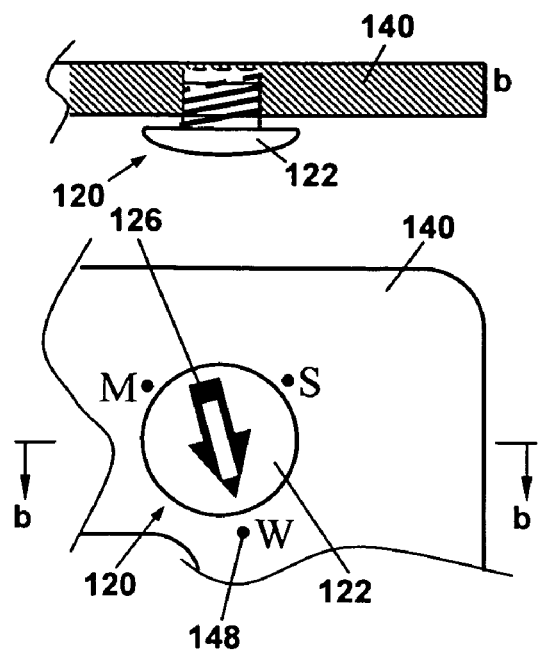
Figure 2D:
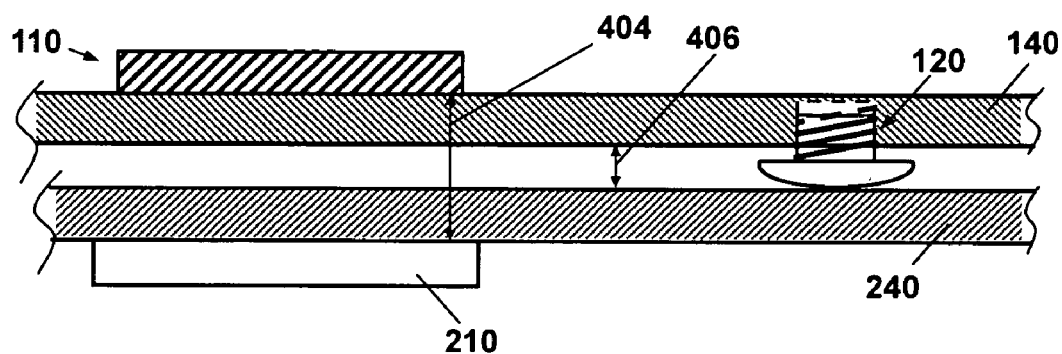

Display assembly 100 further includes at least one tuning bumper 120 disposed on display bezel 140 of display assembly 100. FIGS. 2A-D illustrate tuning bumper 120 and uses thereof with reference to partial cross-sectional views of display bezel 140 and top case 240. FIGS. 2A-B illustrate the use of tuning bumper 120 in a configuration that provides a strong latch and a minimum gap 402 between display bezel 140 and top case 240. FIGS. 2C-D illustrate the use of tuning bumper 120 in a configuration that provides a weak latch and a widened gap 406 between display bezel 140 and top case 240.

In accordance with one or more embodiments of the present invention, tuning bumper 120 includes a height-adjustment mechanism. The height-adjustment mechanism is configured to adjust a height of tuning bumper 120 over a surface of display bezel 140. The height in turn determines the gap between display bezel 140 and top case 240, as well as the distance between Halbach array 110 and attraction plate 210 when display bezel 140 is near or in a closed position with respect to top case 240. In accordance with one or more embodiments, the height-adjustment mechanism includes a screw structure 124 as shown in the example of FIG. 2A.

Tuning bumper 120 may further include a slot 128 disposed on a head 122 that is attached to screw structure 124. Slot 128 may be configured to receive a tool such that a user may use the tool to turn screw structure 124 of tuning bumper 120. Slot 128 may also have a configuration that is used in commercially available screws such as, for example and without limitation, a single slot, Phillips (cross shaped), hex, Robertson (square shaped), TORX (star shaped), or spanner (two slots). The tool may also be any screw driver with a driving head that fits slot 128.

When tuning bumper 120 is turned in a first direction (i.e., clockwise in the example of FIGS. 2A and 2B from marker position (W)eak 148 to (M)edium 150 to (S)trong 146 as indicated by an indicator 126 disposed on head 122), screw structure 124 moves further into display bezel 140, thereby decreasing the height of head 122 above the surface of display bezel 140. Accordingly, when -display bezel 140 is in a closed position with respect to top case 240, the distance between Halbach array 110 and attraction plate 210 is reduced.

As a result, if turning bumper 120 is turned to the marker position (S)trong 146 as is done in FIG. 2A, the magnitude or intensity of the magnetic attraction force between attraction plate 210 and Halbach array 110 is relatively strong (due to the closer gap between attraction plate 210 and Halbach array 110) and a stronger external force is required to unlatch display assembly 100 from base assembly 200. This situation is shown in FIG. 2B, as seen by viewing into the gap between display assembly 100 and base assembly 200.

Conversely, when turning bumper 120 is turned in a second direction opposite the first direction (i.e., counterclockwise in the example of FIGS. 2A and 2B from marker position (S)trong 146 to (M)edium 150 to (W)eak 148), screw structure 124 moves away from display bezel 140 such that such that the height of head 122 above the surface of display bezel 140 is increased. Accordingly, when display bezel 140 is in a closed position with respect to top case 240, the distance between Halbach array 110 and attraction plate 210 is increased.

As a result, if turning bumper 120 is turned to the marker position (W)eak 148 as is done in FIG. 2B, the magnitude or intensity of the magnetic attraction force between attraction plate 210 and Halbach array 110 is relatively weak (due to the wider gap between attraction plate 210 and Halbach array 110) and a weaker external force is required to unlatch display assembly 100 from base assembly 200. This situation is shown in FIG. 2D, as seen by viewing into the gap between display assembly 100 and base assembly 200.

If turning bumper 120 is turned to the marker position (M)edium 150, the magnetic attraction force between attraction plate 210 and Halbach array 110 is in between the strong latching force associated with marker position (S)trong 146 and the weak latching force associated with marker position (W)eak 148.

Although only three marker positions are shown, additional marker positions may be provided. In an embodiment, a detent arrangement or a functionally analogous arrangement may be provided with turning bumper 120 to allow turning bumper 120 to make an audible and/or a tactile feedback (such as a "click") when turned to the appropriate marker position.

Generally speaking, both of the minimum gap 402 and the maximum gap 406 (see FIGS. 2B and 2D respectively) may be based on ergonomic considerations as well as one or more of aesthetic and structural considerations.

In an embodiment, the minimum distance between Halbach array 110 and attraction plate 210 when the electronic device is closed is determined by the desired maximum attraction force. The desired maximum attraction force is, in an embodiment, the strongest latching force desired in situations where unlatching is highly undesirable (e.g., during transportation). In an embodiment, the minimum distance between Halbach array 110 and attraction plate 210 is determined by appropriately dimensioning the thickness of head 122. The minimum distance may be determined, additionally or alternatively, by forming the appropriate "bump" or "depression" in the mating portion of top case 240 that contacts head 122 in the closed position. Additionally or alternatively, the minimum distance may be determined by the rotational position of screw 124 when turning bumper 120 is pointed to the marker position (S)trong 146.

Likewise, the maximum distance between Halbach array 110 and attraction plate 210 when the electronic device is closed is determined by the desired minimum attraction force. The desired minimum attraction force is, in an embodiment, the lowest latching force desired in situations where a high unlatching force is undesirable (e.g., in situations that require the frequent opening and closing of the electronic device or when an infirm person or young child is involved). In an embodiment, the maximum distance between Halbach array 110 and attraction plate 210 is determined by appropriately dimensioning the thickness of head 122. The maximum distance may be determined, additionally or alternatively, by forming the appropriate "bump" or "depression" in the portion of top case 240 that contacts head 122 in the closed position. Additionally or alternatively, the maximum distance may be determined by the rotational position of screw 124 when turning bumper 120 is pointed to the marker position (W)eak 148.

In an embodiment, head 122 may be configured to absorb impact and/or may be made of compressible material and/or resilient material such as rubber without departing from the present invention. Alternatively or additionally, the mating area that contacts head 122 may be formed of a compressible and/or resilient material to reduce the impact of snapping shut the electronic device.

Figure 3:
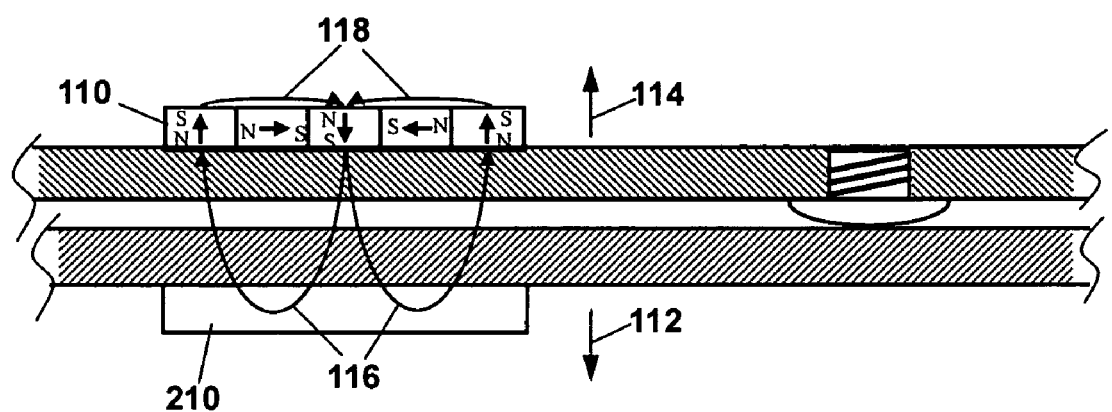
FIG. 3 shows a Halbach array configured in accordance with one or more embodiments of the present invention.

FIG. 3 shows Halbach array 110 configured in accordance with one or more embodiments of the present invention. As illustrated in FIG. 3, Halbach array 110 may include multiple magnetic subunits. The magnetic subunits may be arranged such that Halbach array 110 provides an augmented first magnetic flux 116 in a first direction 112, while a second magnetic flux 118 of Halbach array 110 in a second direction 114 is significantly diminished (to near zero or zero). In the context of the present invention, a Halbach array is defined as a magnetic structure or component that has uneven magnetic fluxes on two different sides of the array. In the example of FIG. 3, the magnetic flux in first direction 112 (shown symbolically by magnetic lines 116) couples with and provides an attraction force to attraction plate 210.

Figure 4:
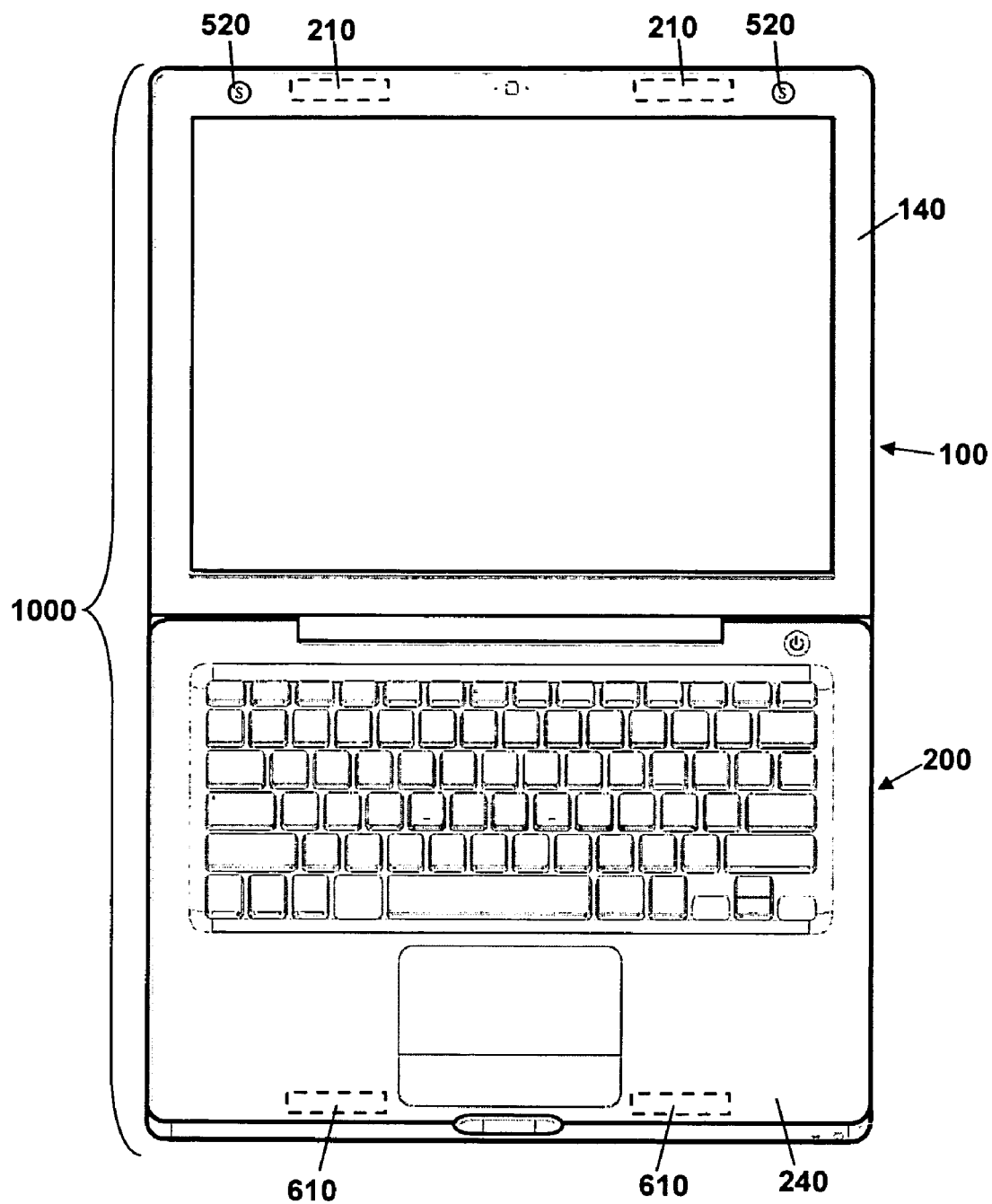
FIG. 4 shows an illustrative representation of an electronic device and a magnetic latch mechanism in accordance with one or more embodiments of the present invention.

FIGS. 4, 5A, 5B, 5C and 5D show an alternative embodiment wherein the selectable magnetic attraction force that is determined by turning bumper 120 of FIGS. 1, 2A, 2B, 2C and 2D is instead determined by replaceable bumper 520. FIG. 4 shows the same electronic device 1000 of FIG. 1 except that turning bumper 120 of FIG. 1 has been replaced by replaceable bumper 520 of FIG. 4, and that the magnetic attraction force is exerted by a magnetic unit 610 captured by base assembly 200 on attraction plate 510 captured by display assembly 140.

Figure 5A:
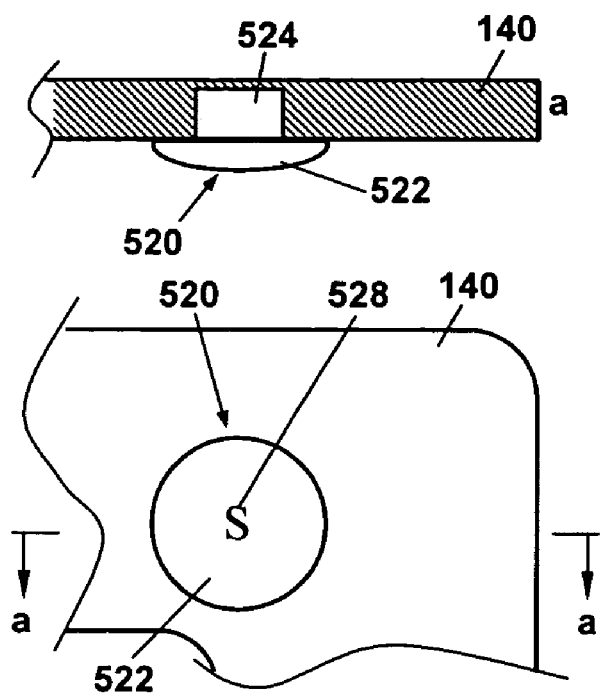
FIGS. 5A-D show illustrative representations of tuning bumpers in accordance with one or more embodiments of the present invention and uses thereof.
Figure 5B:
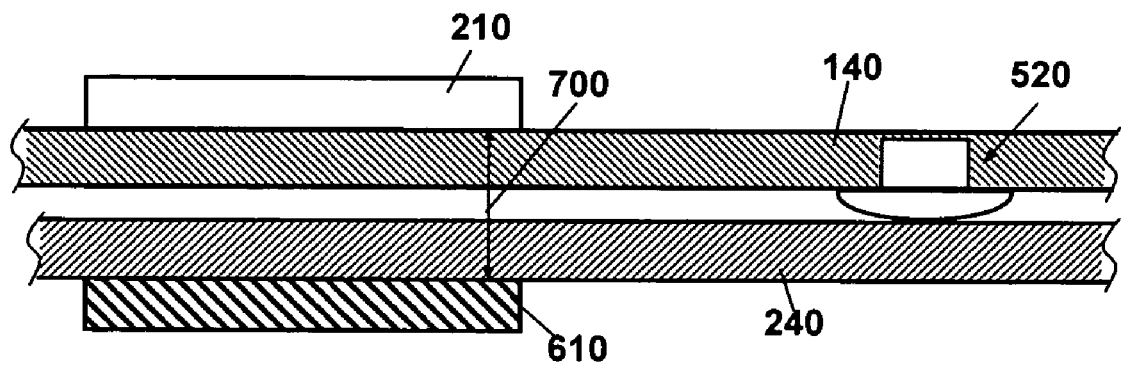

In the example of FIG. 4, replaceable bumper 520 represents a bumper for implementing a (S)trong magnetic latching force. This is shown in FIGS. 5A and 5B wherein replaceable bumper 520 therein is shown labeled with the label "S" 528 indicating that replaceable bumper 520 implements a (S)trong latching force. Replaceable bumper 520, which includes head 522 and shank 524, may be inserted, frictionally fitted, or plugged into a hole in display bezel 140. The top of head 522 and/or the corresponding mating surface on top case 240 are configured such that the distance 700 between magnetic unit 610 and attraction plate 210 of FIG. 5B is fairly close to attain a high latching force. Generally speaking, the latching force may be adjusted by controlling the dimension of one or more of height of head 522, height of shank 524, depth of hole into which shank 524 is inserted, and dimension of the corresponding "bump" or "depression" in the mating surface of top case 240 that contacts head 522 in the closed position.

In an embodiment, it is contemplated that the replacement bumper represents a factory-supplied component. In another embodiment, it is contemplated that the replacement bumper represents a user-configurable component. The user may configure a replacement bumper for a custom latching force by, for example, trim or cut the height of shank 524 or 534.

Figure 5C:
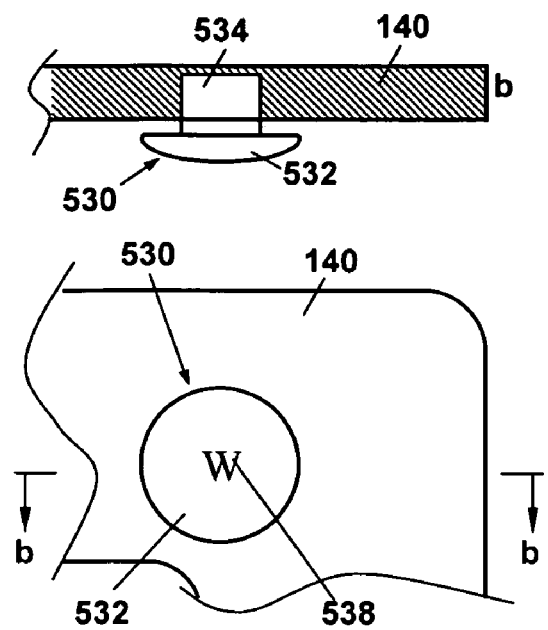
Figure 5D:
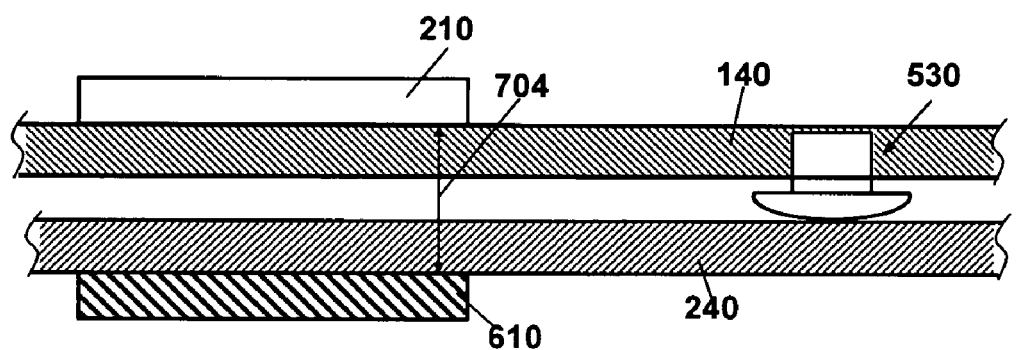

In the example of FIGS. 5C and 5D, replaceable bumper 530 therein is shown labeled with a label "W" 538, indicating that replaceable bumper 530 implements a (W)eak latching force. In this case, the top of head 532 and/or the corresponding mating surface on top case 240 are configured such that the distance 704 between magnetic unit 610 and attraction plate 210 of FIG. 5B is further away from one another to attain a lower latching force. As mentioned, the latching force may be adjusted by controlling the dimension of one or more of height of head 522, height of shank 524, depth of hole into which shank 524 is inserted, and dimension of the corresponding "bump" or "depression" in the mating surface of top case 240 that contacts head 522 in the closed position.

Figure 6A:
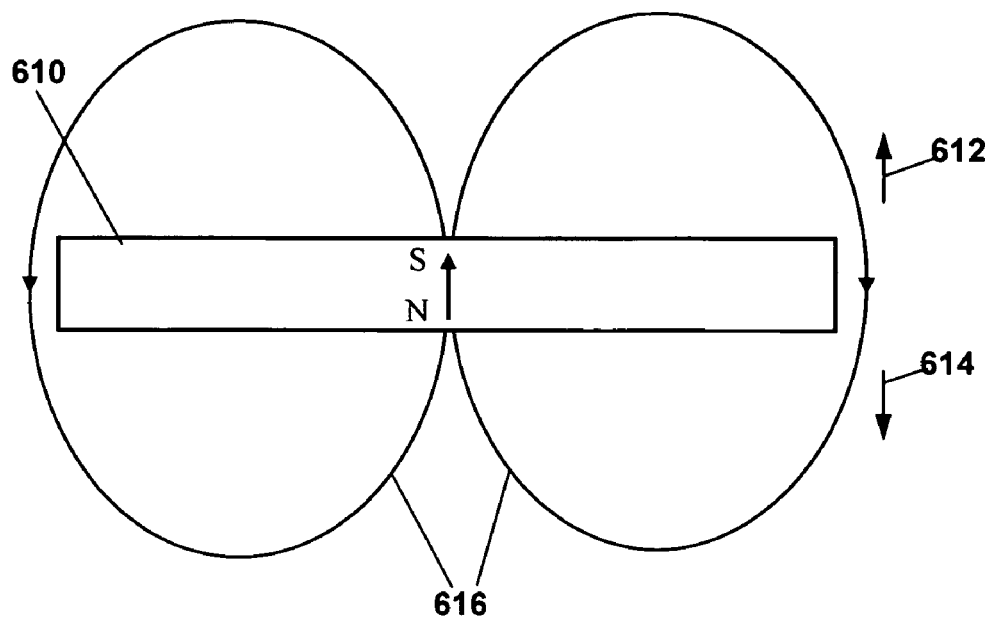
FIGS. 6A-B show a magnetic unit and a magnetic shield in accordance with one or more embodiments of the present invention.
Figure 6B:
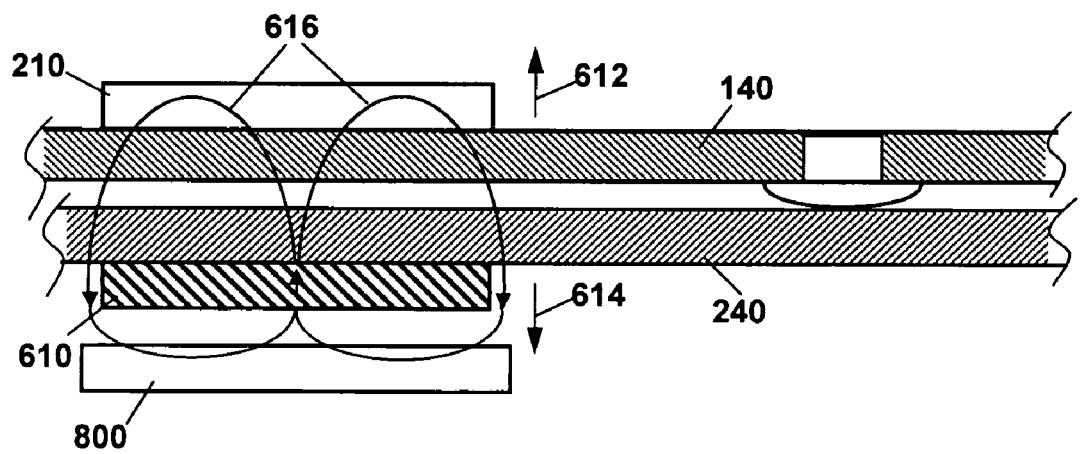

To further protect components that may be sensitive to electromagnetic field radiation, a magnetic shield may be provided to shield one or both of the magnet and the attraction plate. FIGS. 6A-B show magnetic unit 610 and a magnetic shield 800 implemented in accordance with one or more embodiments of the present invention.

As illustrated in the example of FIG. 6A, magnetic unit 610 provides a magnetic flux 616 in a first direction 612 and in a second direction 614 that is opposite first direction 612. In accordance with one or more embodiments of the present invention, magnetic unit 610 represents a Halbach array configured to provide a directed magnetic flux on one side that is different from or lower than the magnetic flux on the other side.

As illustrated in the example of FIG. 6B, in accordance with one or more embodiments of the present invention, the magnetic latch mechanism further includes magnetic shield 800. Magnetic shield 800 may be configured to reduce or eliminate effects of the magnetic flux in second direction 614 while augmenting the magnetic flux in first direction 612. Magnetic shielding 800 may be formed of a suitable shielding material (such as for example a solid or mesh ferrous structure or plate) and dimensioned and/or positioned to provide adequate shielding for the electromagnetically sensitive components.

In accordance with one or more embodiments of the present invention, a magnetic shield may be configured to reduce or eliminate magnetic effects of magnetic unit 610 in a direction that is different from first direction 612.

As can be appreciated from the foregoing, by providing a structure and method for tuning a magnetic latching force between an attraction plate and a magnetic structure (by adjusting the gap between the attraction plate and the magnetic structure), one or more embodiments of the present invention may provide improved ergonomics for different users of the electronic device as well as improved latch performance under various use scenarios of the electronic device.

Further, by augmenting the magnetic flux in a first direction while reducing the magnetic flux in a second direction for the magnetic unit that provides the latching force, one or more embodiments of the present invention may improve latch performance and/or provide improved protection for components that may be sensitive to electromagnetic radiation.

Still further, by using a Halbach array for the magnetic unit, one or more embodiments of the present invention satisfactorily protect components that may be sensitive to electromagnetic radiation while providing the desired magnetic latching functionality without requiring the use of a bulky shield.

While this invention has been described in terms of several embodiments, there are alterations, permutations, and equivalents, which fall within the scope of this invention. It should also be noted that there are many alternative ways of implementing the methods and apparatuses of the present invention. For example, removable sticking bumpers with various thicknesses may be used instead of or in coordination with the screw-type or insert-type tuning bumpers as illustrated, as one skilled in the art can readily appreciate. As another example, the adjustment of the height of the bumper may be made from either side of the display bezel (e.g., by using a turning bumper that extends through the display bezel and has a head designed to accept a turning tool on the side facing away from the top case). As a further example, the tuning bumper (turning type or replaceable type) may be provided on either or both of the display bezel and the top case without departing from the scope of the invention.

As a further example, the magnetic structure (such as the Halbach array, for example) and/or the attraction plate may be disposed on either the display bezel or the top case, as long as there is a magnetic structure/attraction plate pair where a latching force is desired. Furthermore, embodiments of the present invention may find utility in other latching applications such as, for example and without limitation, latching an electronic assembly or component (such as a battery) to a bay of an electronic device (such as a notebook computer). It is therefore intended that the following appended claims be interpreted as including all such alterations, permutations, and equivalents as fall within the true spirit and scope of the present invention.

What is claimed is:

1. A magnetic latch mechanism for latching a first electronic assembly to a second electronic assembly, the magnetic mechanism comprising:
   a Halbach array captured by the first electronic assembly, the Halbach array configured to provide a first magnetic flux in a first direction;
   an attraction plate captured by the second electronic assembly and configured to be coupled with the first magnetic flux when the first electronic assembly is in a closed position with respect to the second electronic assembly such that there is mutual attraction between the attraction plate and the Halbach array in the closed position;
   a tuning bumper, the tuning bumper disposed between the first and second electronic assemblies when the first electronic assembly is in the closed position with respect to the second assembly and configured to tune an intensity of a magnetic attraction force between the attraction plate and the Halbach array; and
   a second tuning bumper, wherein the tuning bumper is replaceable by the second tuning bumper, the tuning bumper having a first predefined height, the second tuning bumper having a second predefined height, the first predefined height being different from the second predefined height.

2. A magnetic latch mechanism for latching a first electronic assembly to a second electronic assembly, the magnetic mechanism comprising:
   a Halbach array captured by the first electronic assembly, the Halbach array configured to provide a first magnetic flux in a first direction;
   an attraction plate captured by the second electronic assembly and configured to be coupled with the first magnetic flux when the first electronic assembly is in a closed position with respect to the second electronic assembly such that there is mutual attraction between the attraction plate and the Halbach array in the closed position; and
   a tuning bumper, the tuning bumper disposed between the first and second electronic assemblies when the first electronic assembly is in the closed position with respect to the second assembly and configured to tune an intensity of a magnetic attraction force between the attraction plate and the Halbach array, including at least an indicator for indicating the intensity of the magnetic attraction force between the attraction plate and the Halbach array.

3. The magnetic latch mechanism of claim 2 further comprising a second tuning bumper, wherein the tuning bumper is replaceable by the second tuning bumper, the tuning bumper having a first predefined height, the second tuning bumper having a second predefined height, the first predefined height being different from the second predefined height.

4. The magnetic latch mechanism of claim 2 wherein the tuning bumper includes a shank having a user-customizable height.

5. The magnetic latch mechanism of claim 2 wherein the tuning bumper comprises a height-adjustment mechanism, the height-adjustment mechanism being configured to adjust a distance between the Halbach array and the attraction plate.

6. The magnetic latch mechanism of claim 5 wherein the height-adjustment mechanism comprises a screw structure.

7. The magnetic latch mechanism of claim 2 further comprising a magnetic shield, the Halbach array being disposed between the attraction plate and the magnetic shield when the first electronic assembly is in the closed position with respect to the second electronic assembly, the magnetic shield being configured to reduce a second magnetic flux of the Halbach array in a second direction different from the first direction.

8. The magnetic latch mechanism of claim 2 further comprising at least one connecting element, the at least one connecting element pivotally connects the first electronic assembly with the second electronic assembly.

9. The magnetic latch mechanism of claim 8 wherein at least one of the first electronic assembly and the second electronic assembly includes a display screen.

10. An electronic device having a magnetic latch mechanism, the electronic device comprising:
    a first electronic assembly;
    a second electronic assembly pivotally connected with the first electronic assembly;

a magnetic means for providing an uneven magnetic flux with respect to at least two sides of the magnetic means, a first side of the magnetic means having a first magnetic flux that is higher in intensity relative to a second magnetic flux associated with a second side of the magnetic means, wherein the magnetic means is captured by the first electronic assembly;

an attraction means for magnetically attracting the magnetic means, the attraction means captured by the second electronic assembly and configured to be coupled with the first magnetic flux when the first electronic assembly is in a closed position with respect to the second electronic assembly such that there is mutual attraction between the attraction plate and the magnetic means in the closed position; and a gap-adjusting means configured to adjust a distance between the magnetic means and the attraction means when the electronic device is in the closed position, the gap-adjusting means including at least an indicator for indicating an intensity of a magnetic attraction force between the attraction means and the magnetic means.

11. The electronic device of claim 10 further comprising a magnetic shield configured to at least partially shield components of the electronic device from the second magnetic flux, the magnetic means being disposed between the attraction means and the magnetic shield when the first electronic assembly is in the closed position with respect to the second electronic assembly.

12. An electronic device having a magnetic latch mechanism, the electronic device comprising:
   a first electronic assembly;
   a second electronic assembly pivotally connected with the first electronic assembly;
   magnetic means for providing an uneven magnetic flux with respect to at least two sides of the magnetic means, a first side of the magnetic means having a first magnetic flux that is higher in intensity relative to a second magnetic flux associated with a second side of the magnetic means, wherein the magnetic means is captured by the first electronic assembly;
   an attraction means for magnetically attracting the magnetic means, the attraction means captured by the second electronic assembly and configured to be coupled with the first magnetic flux when the first electronic assembly is in a closed position with respect to the second electronic assembly such that there is mutual attraction between the attraction plate and the magnetic means in the closed position;
   a gap-adjusting means configured to adjust a distance between the magnetic means and the attraction means when the electronic device is in the closed position; and
   a second gap-adjusting means,
   wherein the gap-adjusting means is replaceable by the second gap-adjusting means, the gap-adjusting means having a first predefined height, the second gap-adjusting means having a second predefined height, the first predefined height being different from the second predefined height.

13. The electronic device of claim 12 wherein the gap-adjusting means includes a screw.

14. An electronic device having a magnetic latch mechanism, the electronic device comprising:
   a first electronic assembly;
   a second electronic assembly pivotally connected with the first electronic assembly;
   a magnetic unit captured by the first electronic assembly, the magnetic unit configured to provide a first magnetic flux in a first direction;
   an attraction plate captured by the second electronic assembly and configured to be coupled with the first magnetic flux when the first electronic assembly is in a closed position with respect to the second electronic assembly such that there is mutual attraction between the attraction plate and the magnetic unit in the closed position; and
   a tuning bumper, the tuning bumper configured to adjust a distance between the magnetic unit and the attraction plate in the closed position, thereby adjusting an intensity of a magnetic attraction force between the magnetic unit and the attraction plate, wherein the tuning bumper includes at least an indicator for indicating the intensity of the magnetic attraction force between the attraction plate and the magnetic unit.

15. The electronic device of claim 14 wherein the magnetic unit comprises a Halbach array.

16. The electronic device of claim 14 further comprising a second tuning bumper, wherein the tuning bumper is replaceable by the second tuning bumper, the tuning bumper having a first predefined height, the second tuning bumper having a second predefined height, the first predefined height being different from the second predefined height.

17. An electronic device having a magnetic latch mechanism, the electronic device comprising:
   a first electronic assembly;
   a second electronic assembly pivotally connected with the first electronic assembly;
   a magnetic unit captured by the first electronic assembly, the magnetic unit configured to provide a first magnetic flux in a first direction;
   an attraction plate captured by the second electronic assembly and configured to be coupled with the first magnetic flux when the first electronic assembly is in a closed position with respect to the second electronic assembly such that there is mutual attraction between the attraction plate and the magnetic unit in the closed position;
   a tuning bumper, the tuning bumper configured to adjust a distance between the magnetic unit and the attraction plate in the closed position, thereby adjusting an intensity of a magnetic attraction force between the magnetic unit and the attraction plate; and
   a second tuning bumper,
   wherein the tuning bumper is replaceable by the second tuning bumper, the tuning bumper having a first predefined height, the second tuning bumper having a second predefined height, the first predefined height being different from the second predefined height.

18. The device of claim 17 wherein the tuning bumper includes a shank having a user-customizable height.

19. The electronic device of claim 17 wherein the tuning bumper includes a screw structure.

20. The electronic device of claim 17 further comprising a magnetic shield, the magnetic unit being disposed between the attraction plate and the magnetic shield when the first electronic assembly is in the closed position with respect to the second electronic assembly, the magnetic shield configured to reduce a second magnetic flux of the magnetic unit in a second direction different from the first direction.

21. The electronic device of claim 17 wherein at least one of the first electronic assembly and the second electronic assembly includes an electronic display.

* * * * *